(12) United States Patent
Zietz

(10) Patent No.: US 8,967,839 B2
(45) Date of Patent: Mar. 3, 2015

(54) INSTRUMENT CLUSTER ILLUMINATED DISPLAY ELEMENT

(75) Inventor: Heath D. Zietz, Ortonville, MI (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 315 days.

(21) Appl. No.: 13/478,372

(22) Filed: May 23, 2012

(65) Prior Publication Data
US 2013/0314851 A1 Nov. 28, 2013

(51) Int. Cl.
*B60Q 1/00* (2006.01)

(52) U.S. Cl.
USPC ........ 362/489; 362/23.19; 362/511; 362/605; 40/547

(58) Field of Classification Search
USPC ........... 40/546, 547; 362/23.12, 23.18, 23.19, 362/489, 511, 565, 605
See application file for complete search history.

(56) References Cited

U.S. PATENT DOCUMENTS

| | | | |
|---|---|---|---|
| 5,206,496 A | 4/1993 | Clement et al. | |
| 5,369,273 A | 11/1994 | Fisun et al. | |
| 5,637,244 A | 6/1997 | Erokhin | |
| 5,653,900 A | 8/1997 | Clement et al. | |
| 5,767,483 A | 6/1998 | Cameron et al. | |
| 6,087,617 A | 7/2000 | Troitski et al. | |
| 6,333,486 B1 | 12/2001 | Troitski | |
| 6,392,683 B1 | 5/2002 | Hayashi | |
| 6,399,914 B1 | 6/2002 | Troitski | |
| 6,417,879 B2 | 7/2002 | Hayashi | |
| 6,426,480 B1 | 7/2002 | Troitski | |
| 6,490,299 B1 | 12/2002 | Raevsky et al. | |
| 6,501,499 B2 | 12/2002 | Hayashi | |
| 6,509,548 B1 | 1/2003 | Troitski | |
| 6,527,193 B1 | 3/2003 | Beli et al. | |
| 6,587,136 B2 | 7/2003 | Hayashi | |
| 6,630,644 B2 | 10/2003 | Troitski | |
| 6,664,501 B1 | 12/2003 | Troitski | |
| 6,720,523 B1 | 4/2004 | Troitski | |
| 6,727,460 B2 | 4/2004 | Troitski | |
| 6,740,846 B1 | 5/2004 | Troitski | |
| 6,768,080 B2 | 7/2004 | Troitski | |
| 6,768,081 B2 | 7/2004 | Troitski | |
| 7,494,256 B1 * | 2/2009 | Kelman et al. | 362/489 |
| 7,655,882 B2 | 2/2010 | Kaplan et al. | |

* cited by examiner

*Primary Examiner* — Stephen F Husar

(57) ABSTRACT

An instrument cluster includes a housing that provides a chamber. A light source is in communication with the chamber. A non-opaque display element is in communication with the chamber and has an exterior surface. An indicium is etched interiorly of the exterior surface without the indicium providing a portion of the exterior surface. The light source is configured to illuminate the indicium.

14 Claims, 3 Drawing Sheets

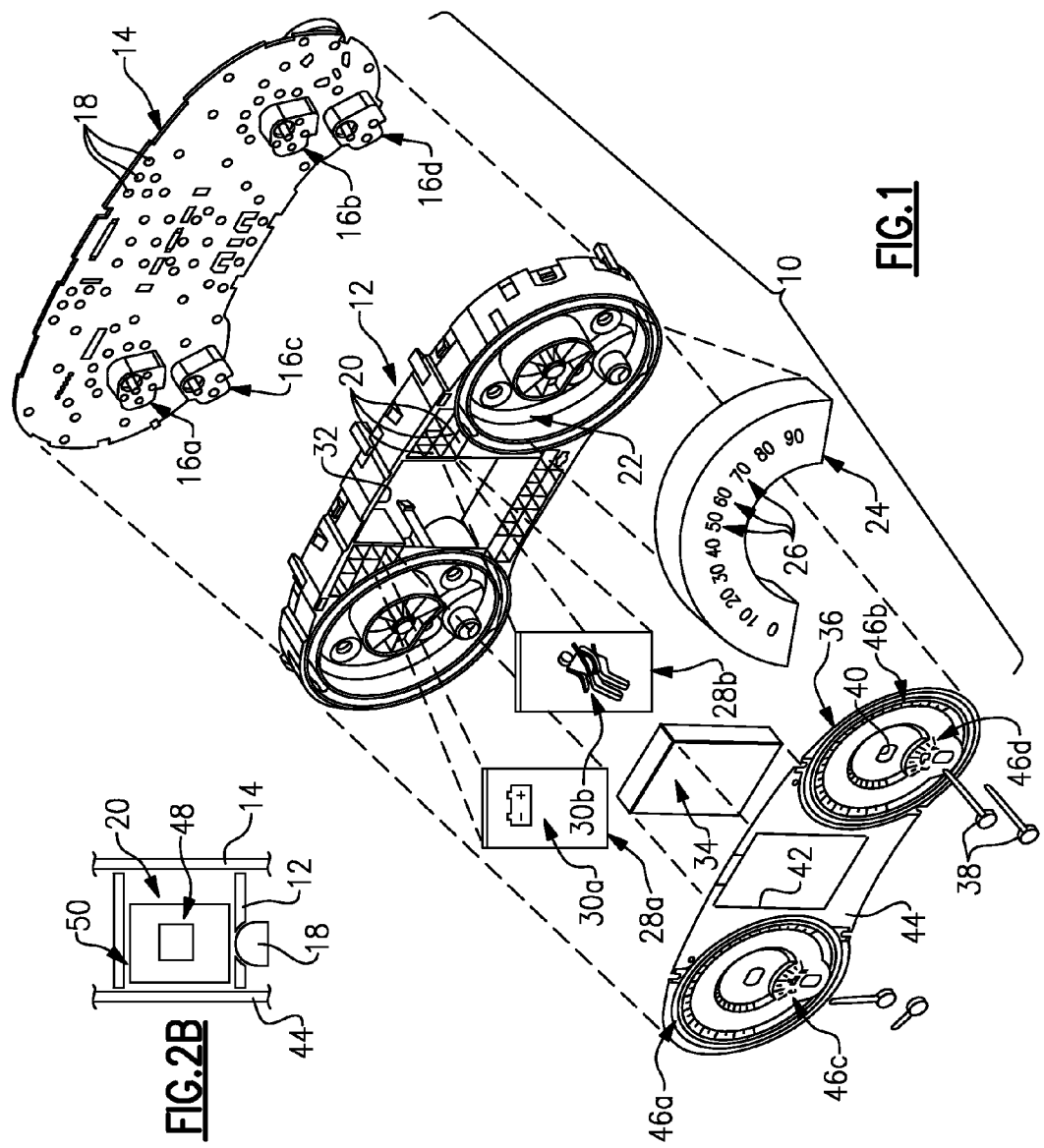

INSTRUMENT CLUSTER ILLUMINATED DISPLAY ELEMENT

BACKGROUND

This disclosure relates to an instrument cluster for an automobile, for example. In particular, the disclosure relates to a decorative display element illuminated during use.

Some modern instrument clusters include an integrated thin film transistor (TFT) liquid crystal display (LCD). Manufacturers use the LCD displays as a flexible means of displaying information to drivers. Instrument clusters also include turn signal indicators and tell-tales, which are used to display warnings to drivers. The tell-tales illuminate when a condition occurs that warrants a warning.

Legal mandates require the use of discrete tell-tales separate from the LCD in case the LCD fails during operation. Typically, a light source is arranged in a light guide or chamber of a housing. A transparent or translucent cover is placed over the chamber. The cover includes a printed or etched indicium, or indicia, which provides the tell-tale, aligned with the chamber. This arrangement may not provide desired styling for the instrument cluster.

SUMMARY

In one embodiment, an instrument cluster includes a housing that provides a chamber. A light source is in communication with the chamber. A non-opaque display element is in communication with the chamber and has an exterior surface. An indicium is etched interiorly of the exterior surface without the indicium providing a portion of the exterior surface. The light source is configured to illuminate the indicium.

In another embodiment, a method of manufacturing an instrument cluster includes the step of providing a non-opaque display element having an exterior surface and an indicium etched interiorly of the exterior surface without the indicium providing a portion of the exterior surface. The method includes the steps of installing the non-opaque display element in an instrument cluster housing, and arranging a light source in communication with the non-opaque display element.

BRIEF DESCRIPTION OF THE DRAWINGS

The disclosure can be further understood by reference to the following detailed description when considered in connection with the accompanying drawings wherein:

FIG. 1 is an exploded view of an example instrument cluster including multiple display elements.

FIG. 2A is a cross-sectional view of the instrument cluster in an area of one of the display elements.

FIG. 2B is a cross-sectional view of the instrument cluster with a display element illuminated from the side.

FIG. 3 is a schematic view of an example display element with an internally etched indicium.

DETAILED DESCRIPTION

Figure 4B:
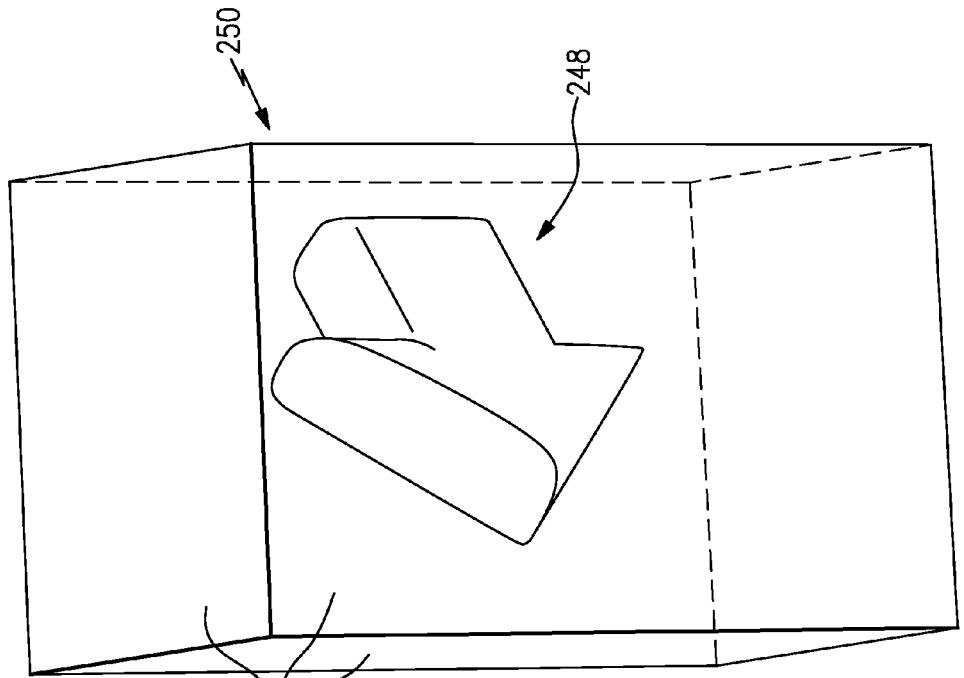
FIGS. 4A-4D illustrate display elements having example indicia.

An exploded view of an example instrument cluster 10 is illustrated in FIG. 1. The instrument cluster 10 includes a housing 12, which provides structural support for various instrument cluster components. A printed circuit board (PCB) 14 supports gauge output devices 16A-16D and light sources 18, such as light emitting diodes (LED) 18. In the example, the gauge output device 16A corresponds to a tachometer, the gauge output device 16B corresponds to a speedometer, the gauge output device 16C corresponds to an engine coolant temperature gauge, and the gauge output device 16D corresponds to a fuel gauge.

The housing 12 provides multiple chambers 20, which are in communication with the light sources 18 when the instrument cluster 10 is assembled, as best shown in FIG. 2A. The chambers 20 are opaque to prevent light from passing into adjoining chambers.

Returning to FIG. 1, the housing 12 includes several arcuate cavities 22 that each receive first display elements 24. The first display elements 24 (only one shown) are arcuate in shape and include numerical indicia 26 corresponding to RPM and speed values. Each first display element 24 is received in its respective cavity 22 with the instrument cluster 10 assembled. Multiple second display elements 28a, 28b (collectively "28") each include an indicium 30a, 30b corresponding to an alphanumerical character, a turn signal indicator or a tell-tale, such as warnings relating to low washer fluid, battery voltage, oil pressure, oil level, oil temperature, seatbelt status, airbag status, brake pad wear, parking brake condition, check-engine, high beams, parking lights, for example. In the example, the second display elements 28 are arranged in the chamfers 20.

The housing 12 may also include an aperture 32 that supports a TFT LCD 34. The LCD 34 may also display turn signal and/or tell-tale information or other types of information to the driver. A cover 36 is arranged over the housing 12. The cover 36 includes an opening 42 through which the LCD 34 is exposed for viewing. The cover 36 includes holes 40 permitting the shafts of the gauge output devices 16A-16D to protrude through the cover 36. Needles 38 are mounted to the gauge output devices 16A-16D. The cover 36 includes gauge indicia 46, which may be printed or externally etched tick marks, for example, positioned such that the moveable needles 38 align with the gauge indicia 46 in a manner in which information concerning the vehicle, such as engine RPM or vehicle speed, is conveyed to the driver.

In the example, the cover 36 includes a portion 44 that is translucent and/or transparent. The portion 44 covers the first and second display elements 24, 28. The first and second display elements 24, 28 may be generally hidden from the driver except when the first and second display elements 24, 28 are illuminated by the light source 18. In the example, the portion 44 does not include any indicia or etching in the area over the first and second display elements 24, 28.

Referring to FIGS. 2A-3, a generic non-opaque display element is depicted schematically. FIG. 2A illustrates rear display element illumination, and FIG. 2B illustrates side display illumination. The display element is constructed of translucent or transparent material 50, such as acrylic. The material 50 has an exterior surface 52, which may be generally cubic in shape, in the example shown. An indicium 48, or indicia, is etched interiorly of the exterior surface 52 without the indicium 48 providing a portion of the exterior surface 52. In addition to alphanumeric characters, turn signal indicators and tell-tales, customer logos, tick marks or other images may be internally etched into the material. The indicium 48 may be etched using a laser etching or electron beam etching process, which creates microcracks from locally heating the plastics. These microcracks scatter the light and provide the three-dimensional image. The etched indicium provides a three-dimensional image that enhances the aesthetic appearance of the instrument cluster 10 when illuminated.

Figure 4A:
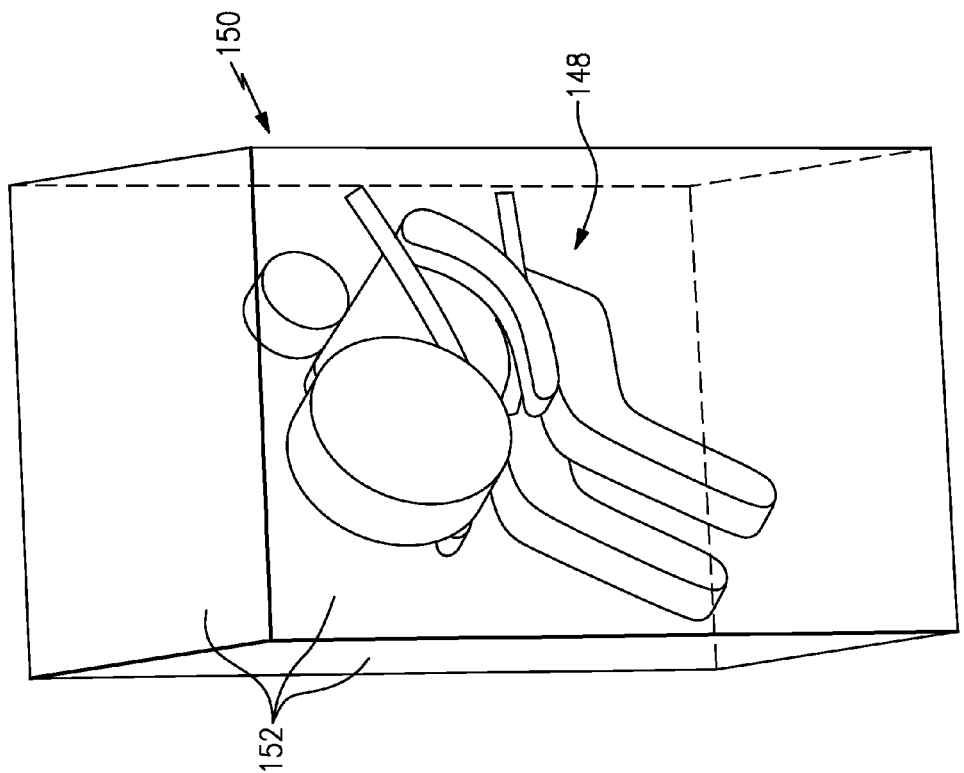
Figure 4D:
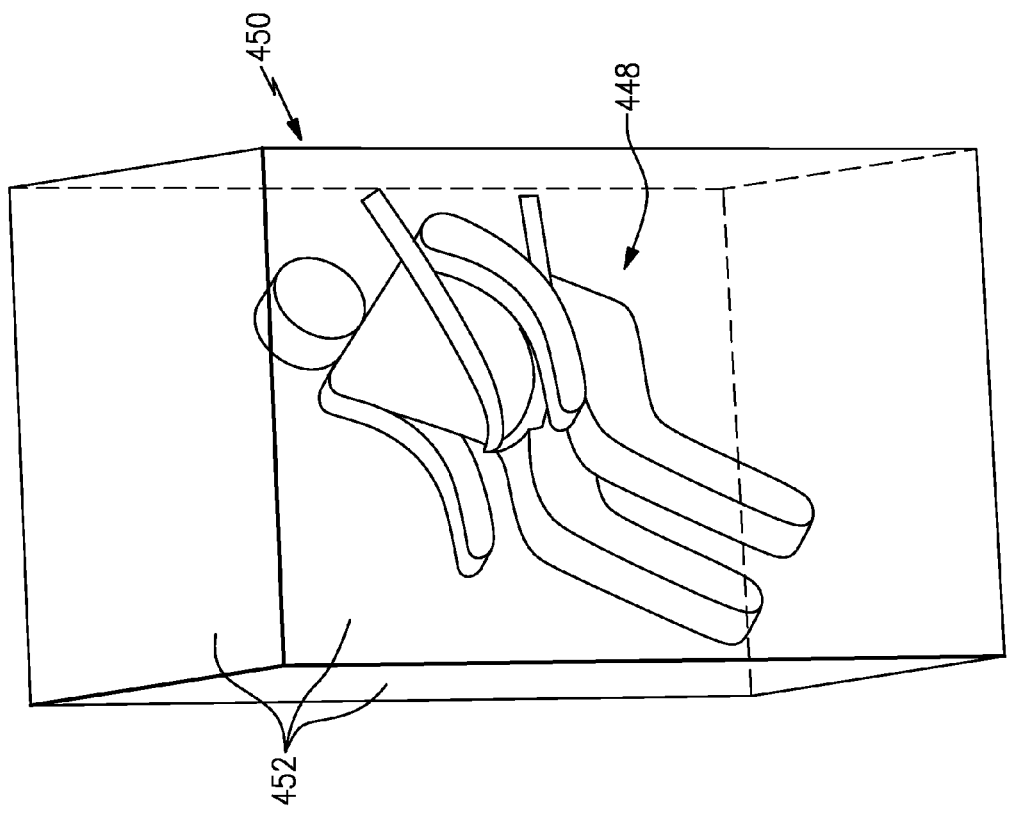
Figure 4C:
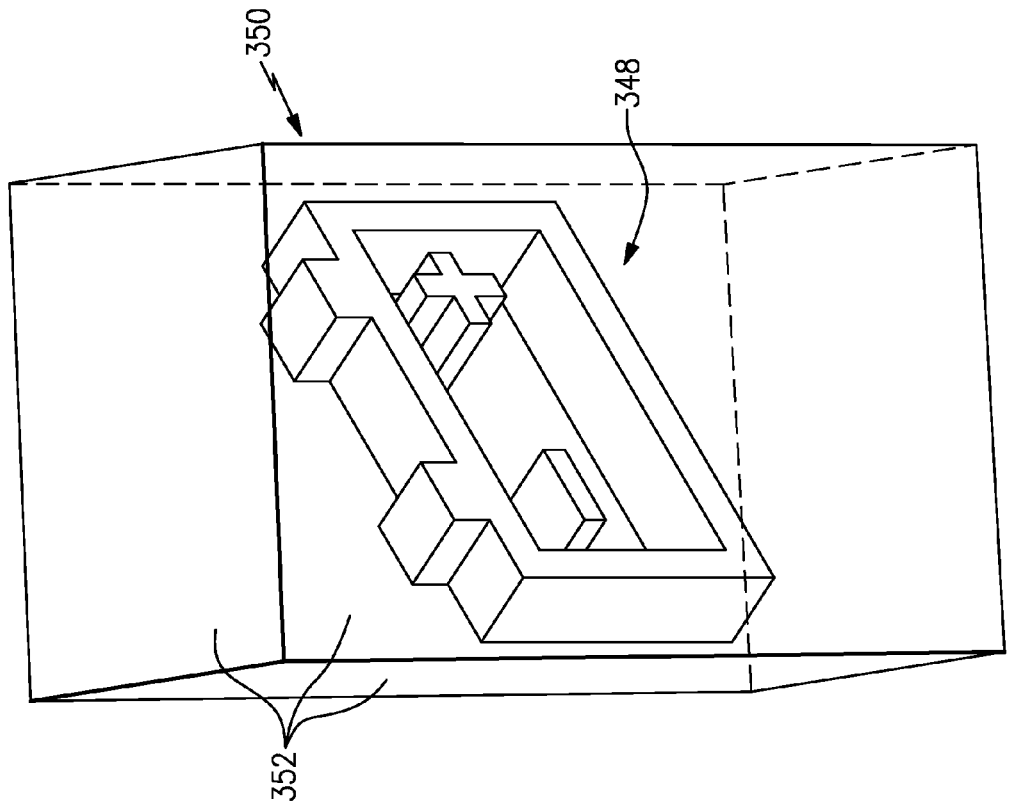

Example second display elements 150, 250, 350, 450 having indicia 148, 248, 348, 448 are illustrated in FIGS. 4A-4D.

The indicia 148, 248, 348, 448 are three-dimensional images etched interiorly of the exterior surfaces 152, 252, 352, 452, which provides unique attractive styling.

Although an example embodiment has been disclosed, a worker of ordinary skill in this art would recognize that certain modifications would come within the scope of the claims. For example, the display elements may be illuminated from the back or sides. For that reason, the following claims should be studied to determine their true scope and content.

What is claimed is:

1. An instrument cluster comprising:
    a housing providing a plurality of chambers;
    a plurality of light sources, each light source in communication with a chamber of the plurality of chambers; and
    a plurality of non-opaque display elements, each display element being in communication with a chamber of the plurality of chambers, each display element having an exterior surface and an indicium etched interiorly of the exterior surface without the indicium providing a portion of the exterior surface, each light source configured to illuminate the indicium of one of the display elements of the plurality of display elements.

2. The instrument cluster according to claim 1, comprising a printed circuit board arranged adjacent to the housing, the light source mounted to the printed circuit board.

3. The instrument cluster according to claim 2, wherein each light source is an LED.

4. The instrument cluster according to claim 1, wherein each non-opaque display element is one of a transparent material and a translucent material.

5. The instrument cluster according to claim 4, wherein the one of the transparent material and the translucent material is acrylic.

6. The instrument cluster according to claim 1, wherein the housing is opaque, and each non-opaque display element is arranged in a chamber of the plurality of chambers.

7. The instrument cluster according to claim 1, wherein the indicium is at least one of a tell-tale, an indicator and an alphanumeric character.

8. An instrument cluster comprising:
    a housing providing a chamber;
    a light source in communication with the chamber; and
    a non-opaque display element in communication with the chamber and having an exterior surface, an indicium etched interiorly of the exterior surface without the indicium providing a portion of the exterior surface, the light source configured to illuminate the indicium, further comprising a cover adjacent to the housing, the cover includes a portion providing at least one of a transparent material and a translucent material arranged over the non-opaque display element.

9. The instrument cluster according to claim 8, wherein the cover includes gauge indicia, and comprising a needle configured to be movably aligned with the gauge indicia.

10. The instrument cluster according to claim 9, wherein the non-opaque display element adjoins the gauge indicia and provides alphanumeric characters.

11. The instrument cluster according to claim 1, comprising an LCD supported by the housing.

12. A method of manufacturing an instrument cluster comprising the steps of:
    providing a non-opaque display element having an exterior surface, and an indicium etched interiorly of the exterior surface without the indicium providing a portion of the exterior surface;
    installing the non-opaque display element in an instrument cluster housing;
    arranging a light source in communication with the non-opaque display element; and
    positioning a cover including at least one of a transparent material and a translucent material over the non-opaque display element.

13. The method according to claim 12, wherein the non-opaque display element providing step includes one of laser etching and electron beam etching at least one of a tell-tale, an indicator and an alphanumeric character internally and within the non-opaque display element.

14. The method according to claim 12, wherein the non-opaque display element installing step includes inserting the non-opaque display element into an opaque chamber in the instrument cluster housing.

\* \* \* \* \*